US009750033B2

United States Patent
Uchino et al.

(10) Patent No.: US 9,750,033 B2
(45) Date of Patent: Aug. 29, 2017

(54) MOBILE STATION, BASE STATION, MOBILE COMMUNICATION SYSTEM, TRANSMISSION CONTROL METHOD, AND RECEPTION CONTROL METHOD

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 99 days.

(21) Appl. No.: 14/889,345

(22) PCT Filed: May 2, 2014

(86) PCT No.: PCT/JP2014/062191
§ 371 (c)(1),
(2) Date: Nov. 5, 2015

(87) PCT Pub. No.: WO2014/181779
PCT Pub. Date: Nov. 13, 2014

(65) Prior Publication Data
US 2016/0119934 A1    Apr. 28, 2016

(30) Foreign Application Priority Data

May 9, 2013    (JP) ................................. 2013-099326

(51) Int. Cl.
*H04W 72/00* (2009.01)
*H04W 72/08* (2009.01)
(Continued)

(52) U.S. Cl.
CPC .......... *H04W 72/08* (2013.01); *H04L 1/0027* (2013.01); *H04W 24/10* (2013.01);
(Continued)

(58) Field of Classification Search
CPC ............. H04W 74/0833; H04W 88/02; H04W 52/346; H04W 72/0473; H04W 52/325;
(Continued)

(56) References Cited

U.S. PATENT DOCUMENTS

2014/0226613 A1*    8/2014    Kim ...................... H04L 1/1812
370/329

OTHER PUBLICATIONS

International Search Report issued in PCT/JP2014/062191 mailed on Jul. 29, 2014 (2 pages).
(Continued)

*Primary Examiner* — Kwasi Karikari
(74) *Attorney, Agent, or Firm* — Osha Liang LLP

(57) ABSTRACT

A mobile station that communicates with a base station, including: means that determines whether to transmit, to the base station, quality information indicating radio quality when a predetermined time elapses based on a state, of the mobile station, which is an active state or not in discontinuous reception control; and means that, even when it is determined not to transmit the quality information based on the determination, transmits the quality information when the predetermined time elapses in a case where a scheduling request is transmitted to the base station before the predetermined time elapses.

11 Claims, 15 Drawing Sheets

(51) Int. Cl.
  *H04W 52/02* (2009.01)
  *H04W 76/04* (2009.01)
  *H04W 72/12* (2009.01)
  *H04L 1/00* (2006.01)
  *H04W 24/10* (2009.01)
  *H04W 52/24* (2009.01)

(52) U.S. Cl.
  CPC ... *H04W 52/0216* (2013.01); *H04W 72/1284* (2013.01); *H04W 76/048* (2013.01); *H04W 52/241* (2013.01); *H04W 76/046* (2013.01); *Y02B 60/50* (2013.01)

(58) Field of Classification Search
  CPC ............. H04W 56/005; H04W 76/048; H04W 72/1284; H04W 36/30; H04W 72/1278; H04L 5/0057
  USPC ...................................................... 455/452.1
  See application file for complete search history.

(56) References Cited

OTHER PUBLICATIONS

Written Opinion of the International Searching Authority issued in PCT/JP2014/062191 mailed on Jul. 29, 2014 (3 pages).
Samsung; "Discussion on Active time and CSI/SRS activity"; 3GPP TSG-RAN2 #75bis meeting, R2-115031; Zhuhai, China; Oct. 10-14, 2011 (4 pages).
Samsung; "Discussion on DRX cycle and CSI/SRS transmission"; 3GPP TSG-RAN WG2 Meeting #79, R2-124082; Qingdao, P.R.C.; Aug. 13-17, 2012 (5 pages).
Ericsson et al.; "Periodic CSI and SRS at DRX state change"; 3GPP TSG-RAN WG2 #79, R2-123863; Qingdao, China; Aug. 13-17, 2012 (7 pages).
3GPP TS 36.321 V11.3.0; "3rd Generation Partnership Project; Technical Specification Group Radio Access Network; Evolved Universal Terrestrial Radio Access (E-UTRA); Medium Access Control (MAC) protocol specification (Release 11)"; Jun. 2013 (57 pages).
Samsung et al.; "Correction to remove optionality of CSI/SRS transmission during transient state"; 3GPP TSG-RAN WG2 Meeting #81, R2-130844; St. Julian's, Malta; Jan. 28,-Feb. 1, 2013 (4 pages).
Extended European Search Report in counterpart European Patent Application No. 14 795 351.7 issued Jul. 25, 2016 (9 pages).
ZTE Corporation; "CQI, srs transmission considering Scheduling Request"; 3GPP TSG-RAN2 Meeting #82, R2-131643; Fukuoka, Japan; May 20-24, 2013 (2 pages).
ZTE; "Further issues on removing optionality of CSI/SRS transmission during transient state"; 3GPP TSG-RAN WG2 Meeting #82; R2-131644; Fukuoka, Japan; May 21-24, 2016 (4 pages).
Office Action issued in corresponding Japanese Application No. 2013-099326, mailed Mar. 21, 2017 (5 pages).
Alcatel-Lucent, Alcatel-Lucent Shanghai Bell; "Measurement and DRX solution"; TSG-RAN WG2#75bis, R2-115341; Zhuhai, China; Oct. 10-14, 2011 (2 pages).
Ericsson (Rapporteur); "Email Discussion Report on CSI/SRS reporting at DRX state change"; 3GPP TSG-RAN WG2 080, Tdoc R2-125628; New Orleans, Louisiana, USA; Nov. 12-16, 2012 (20 pages).
Office Action issued in corresponding European Application No. 14795351.7, dated Apr. 21, 2017 (4 pages).

\* cited by examiner

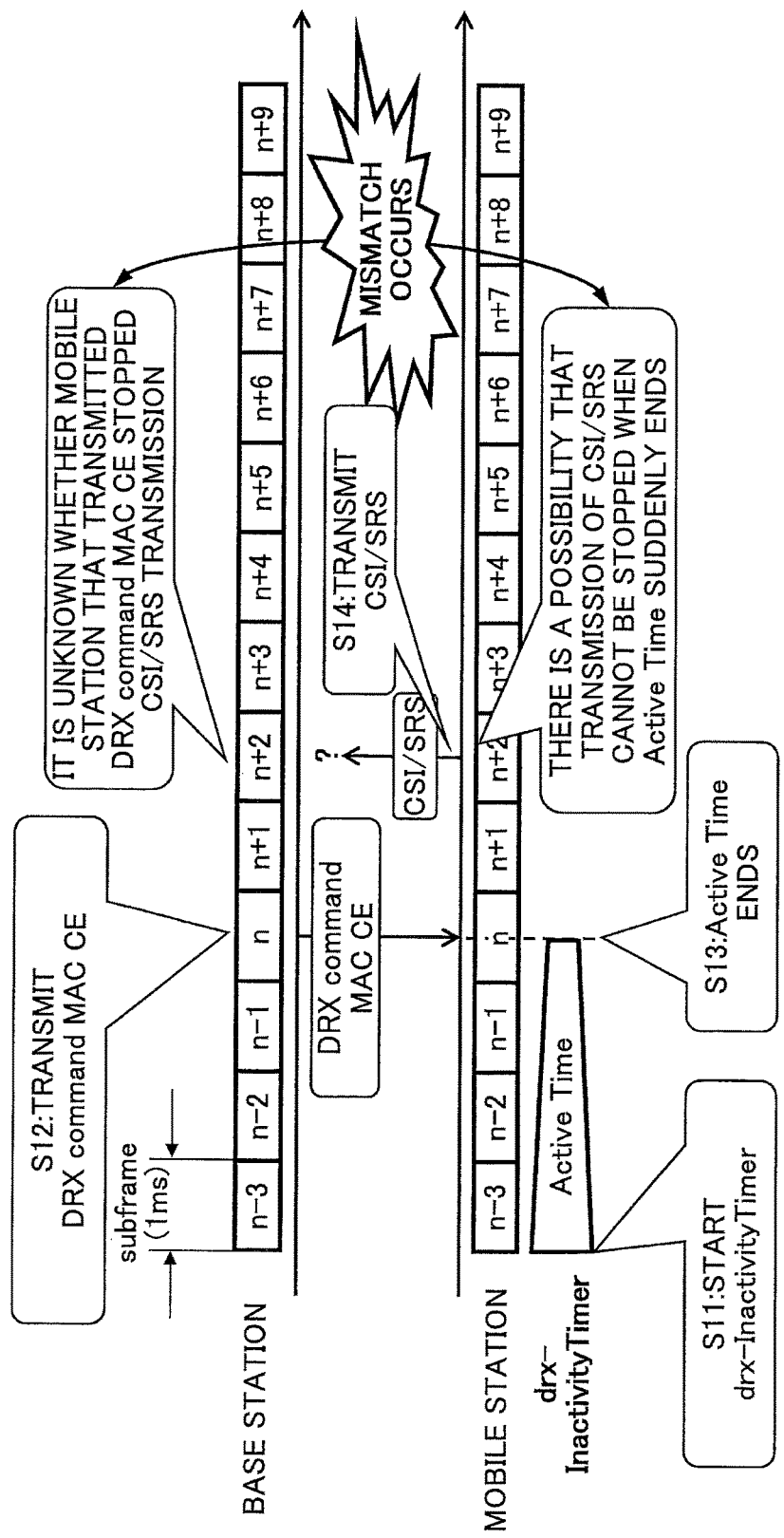

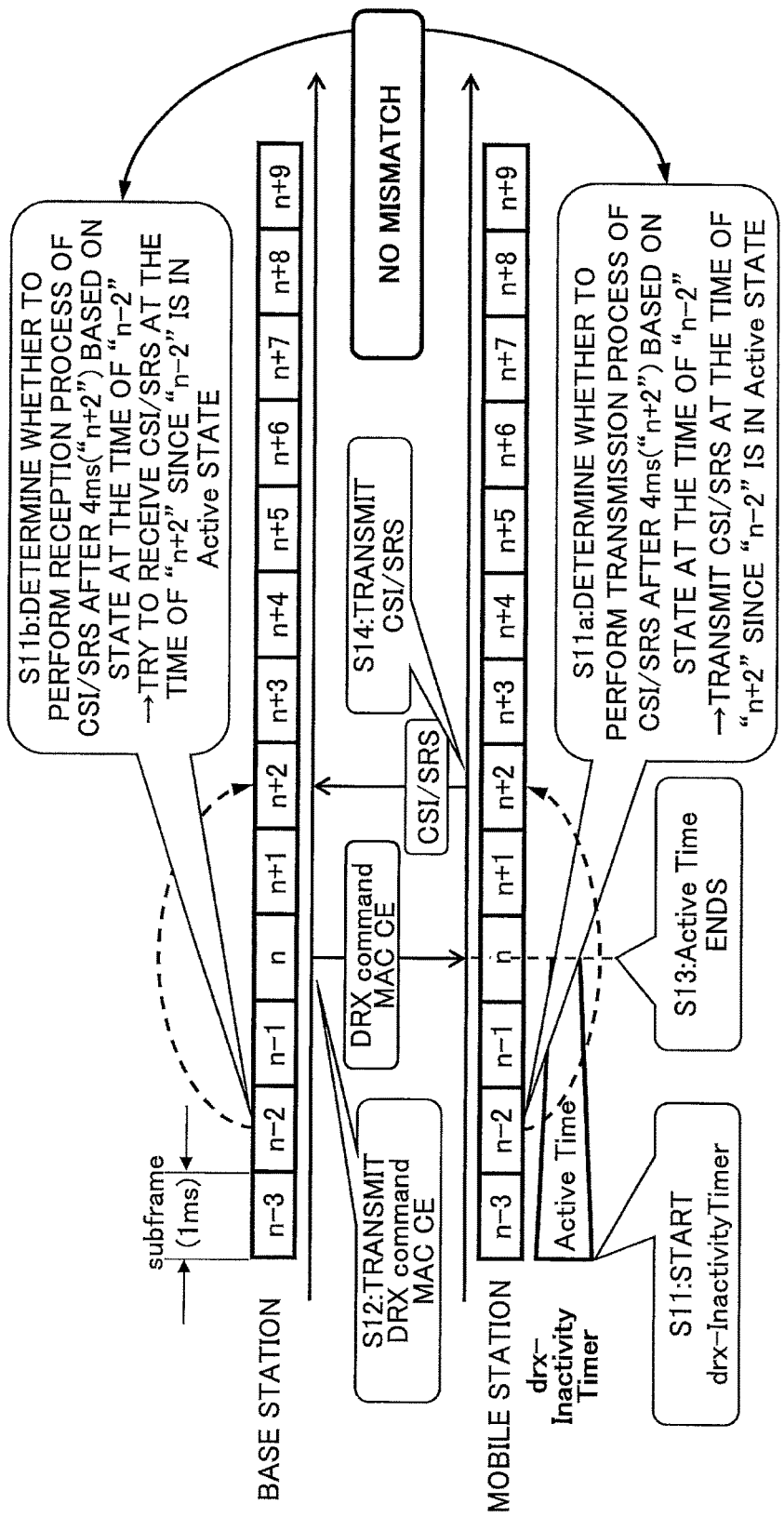

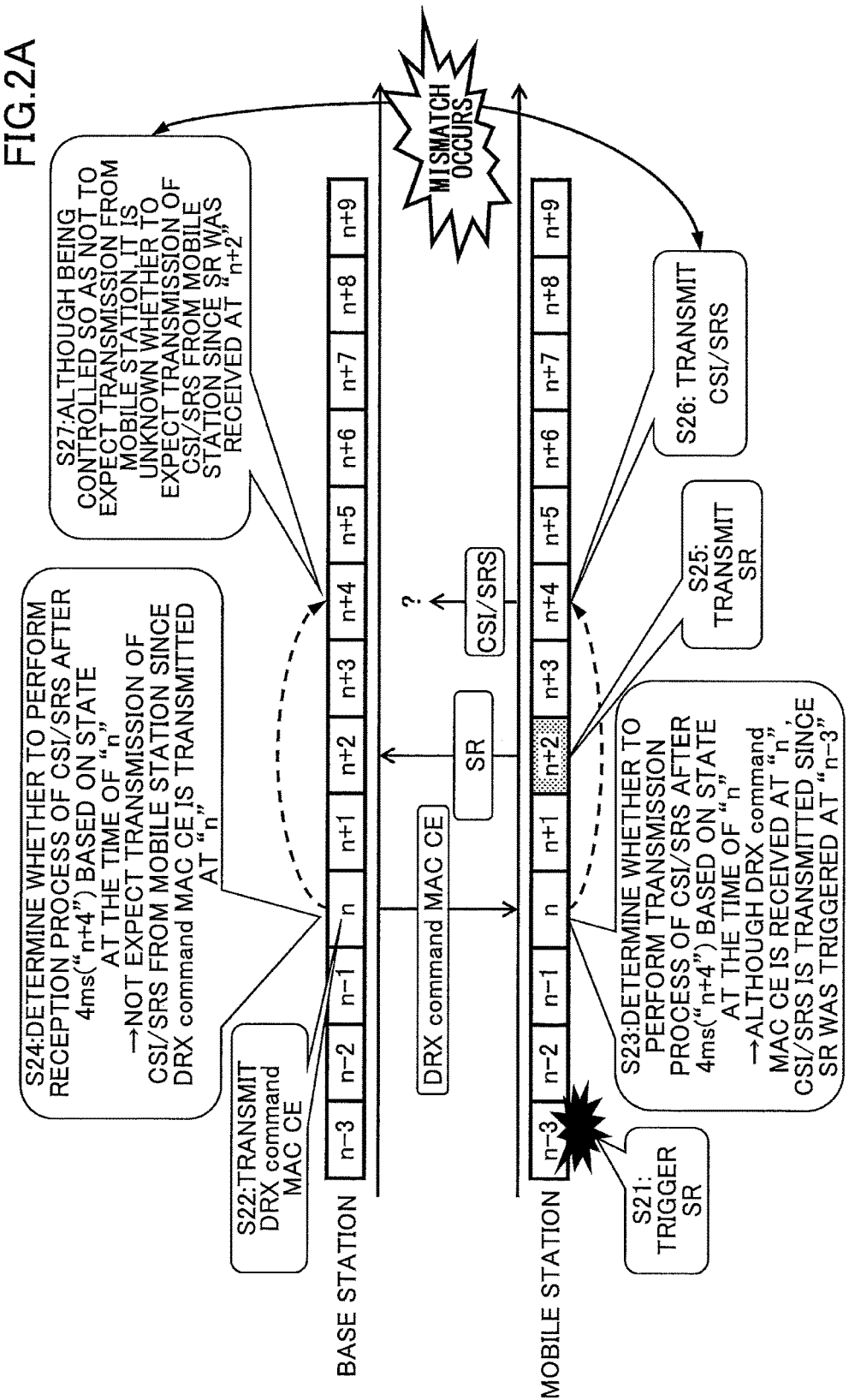

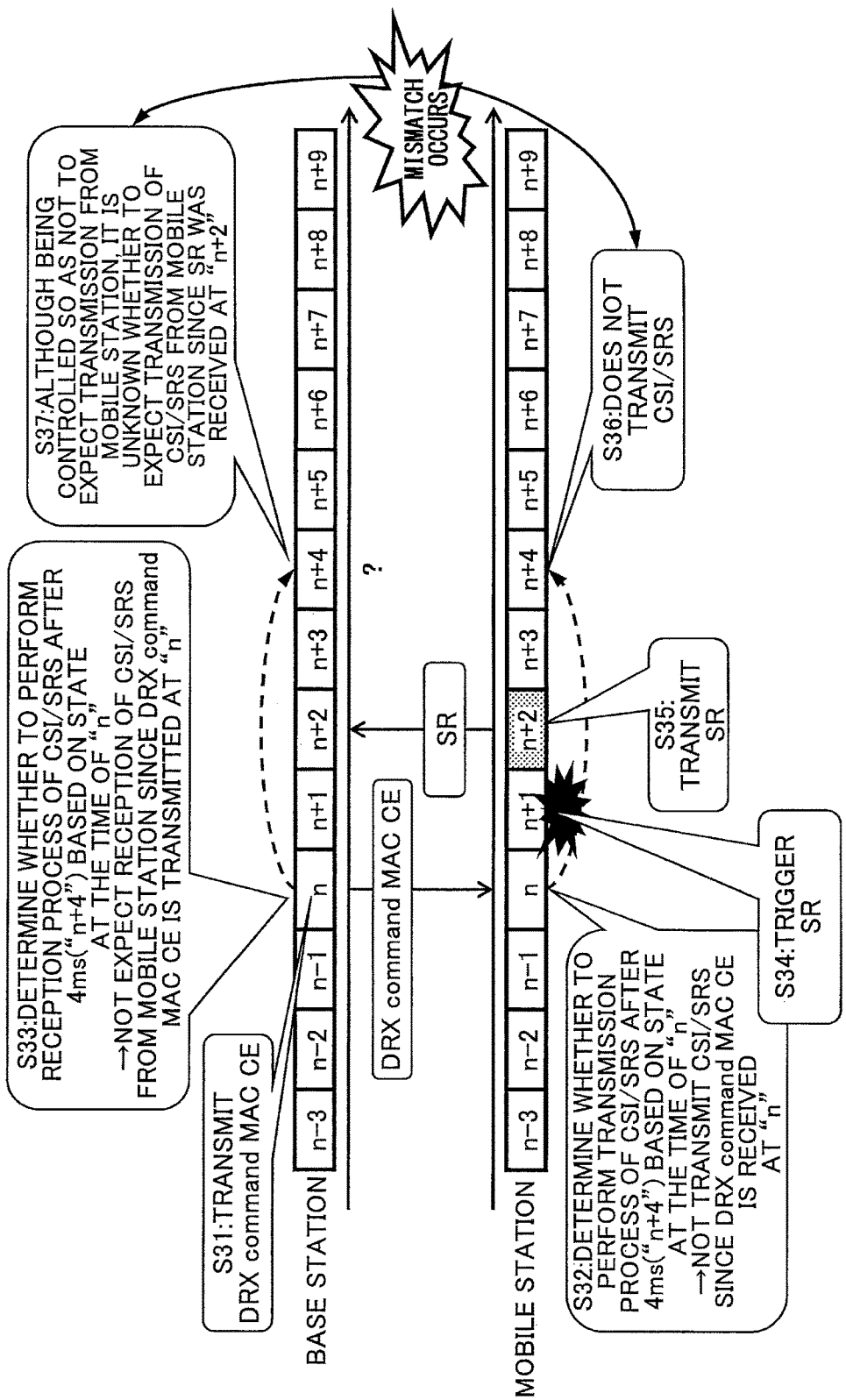

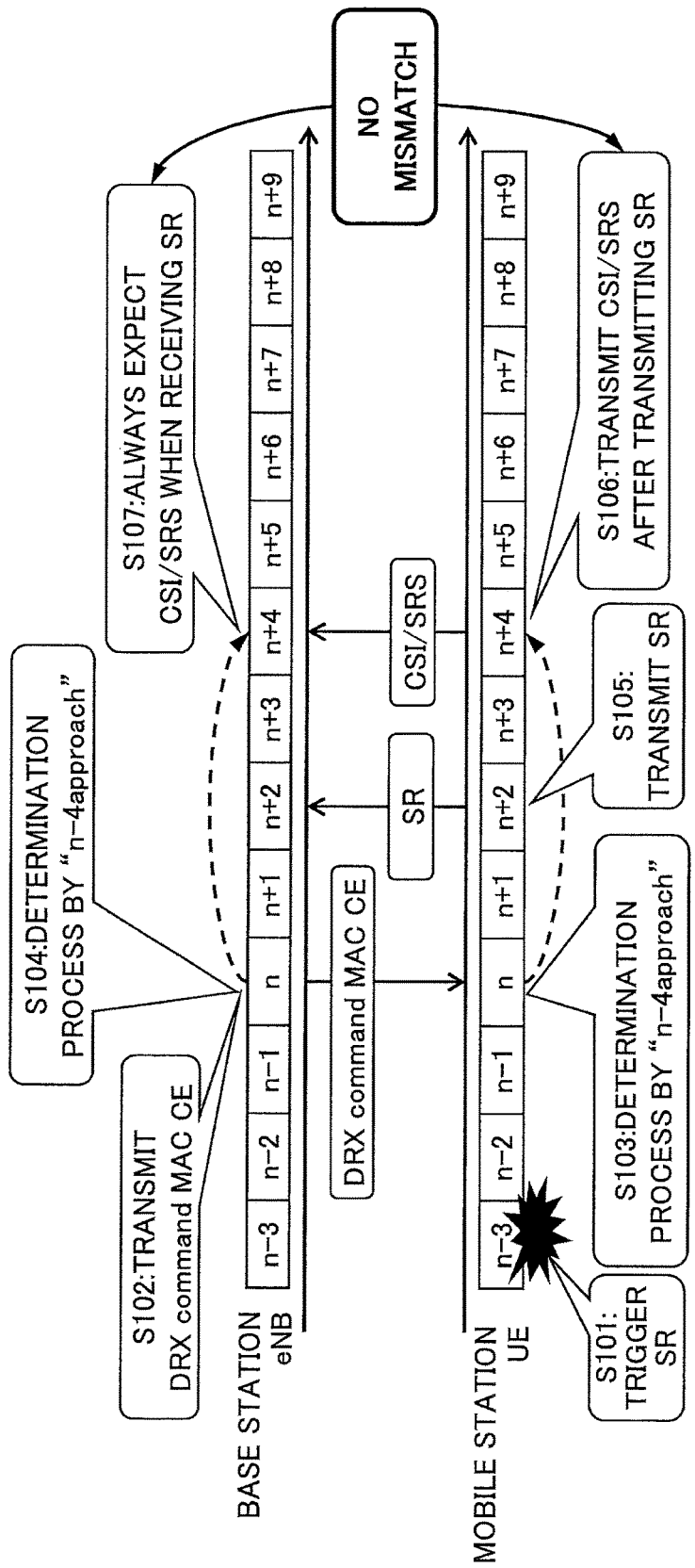

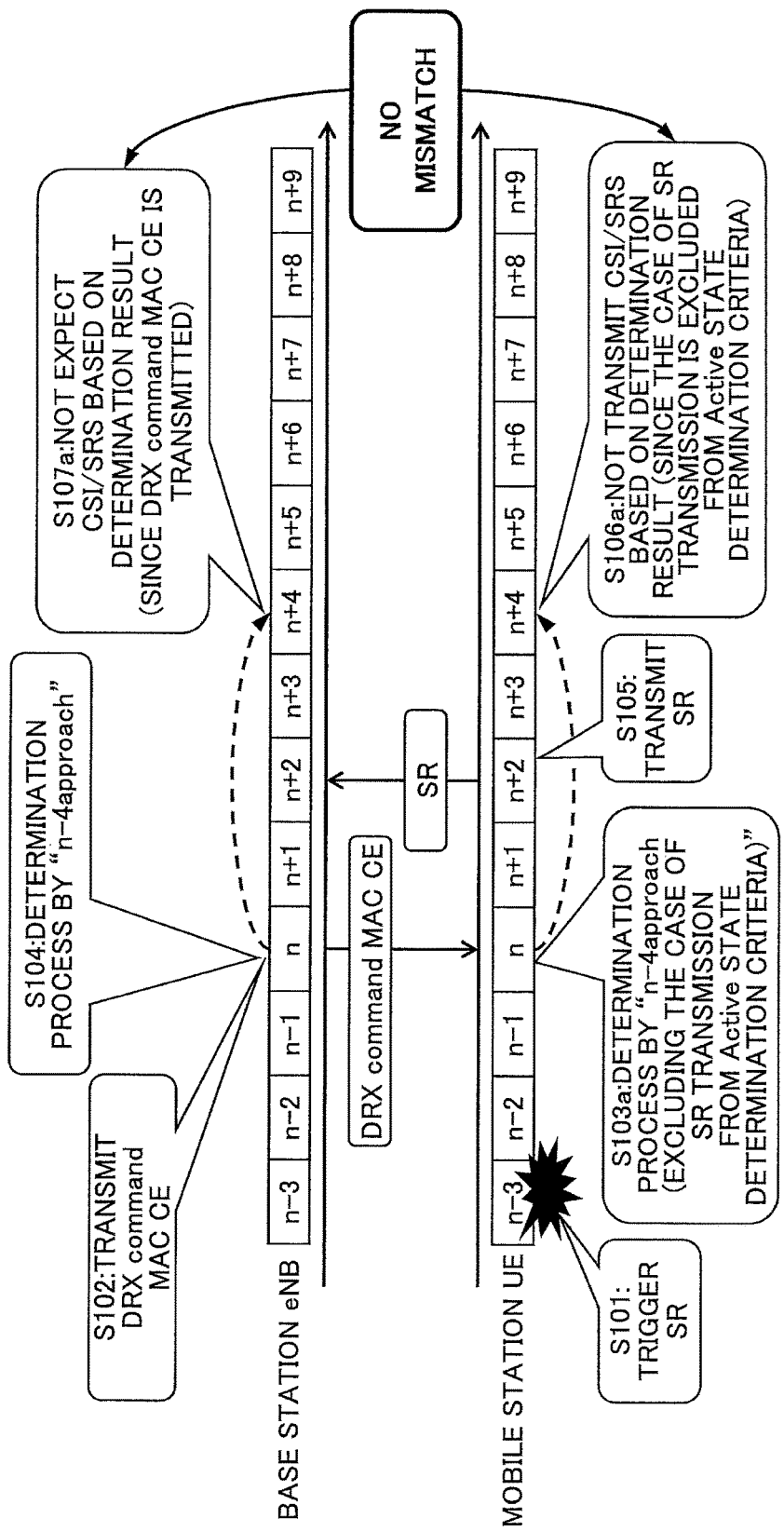

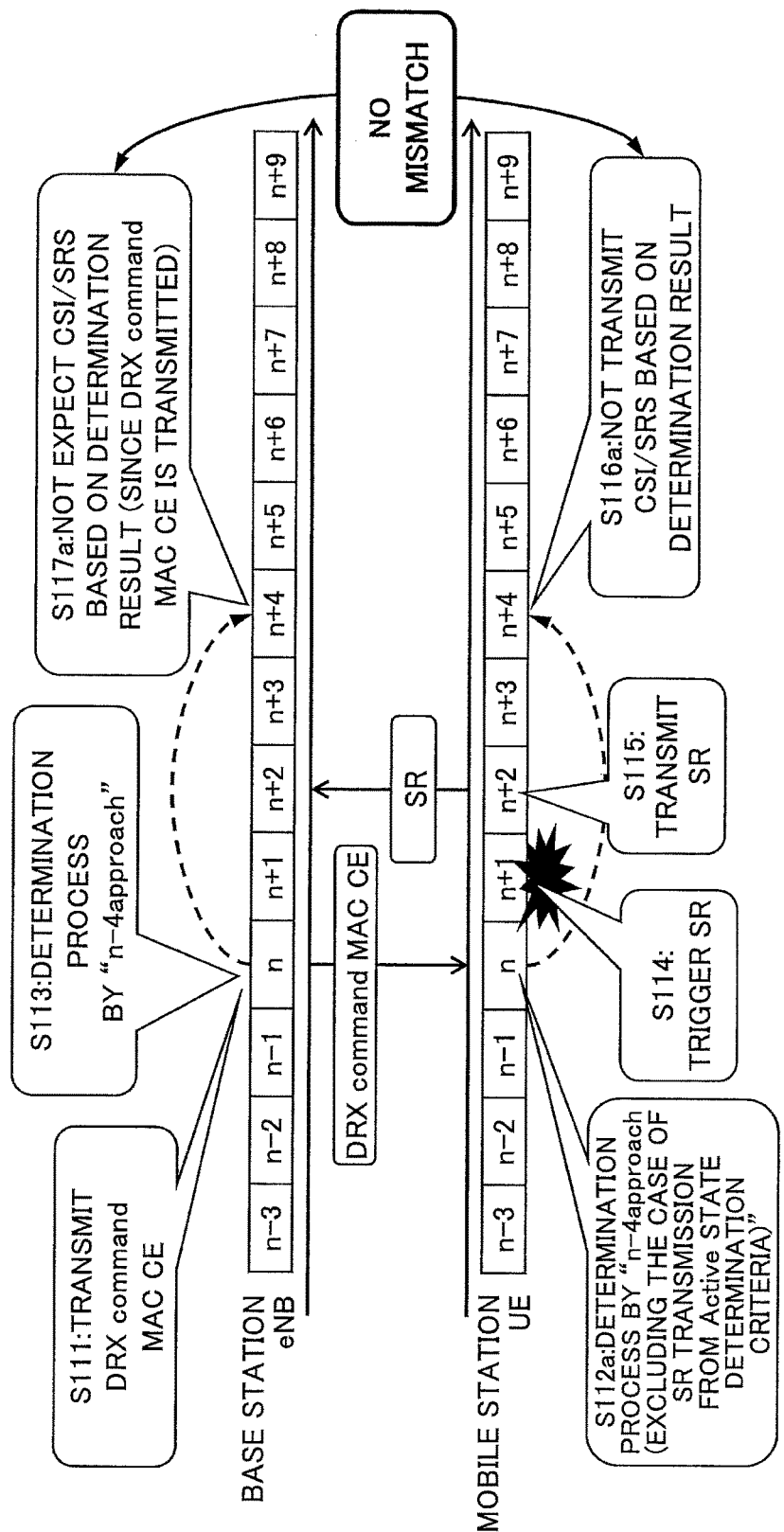

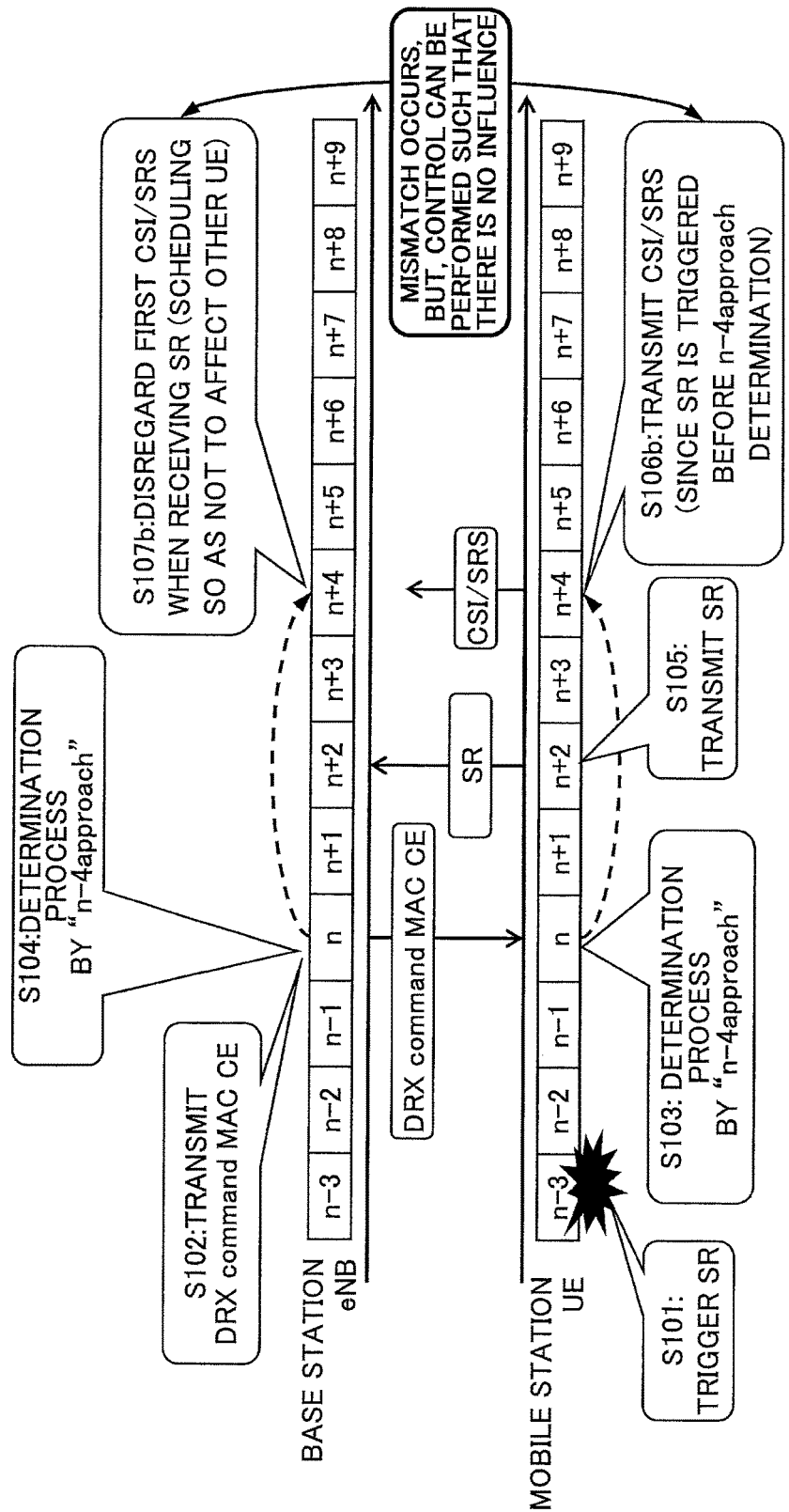

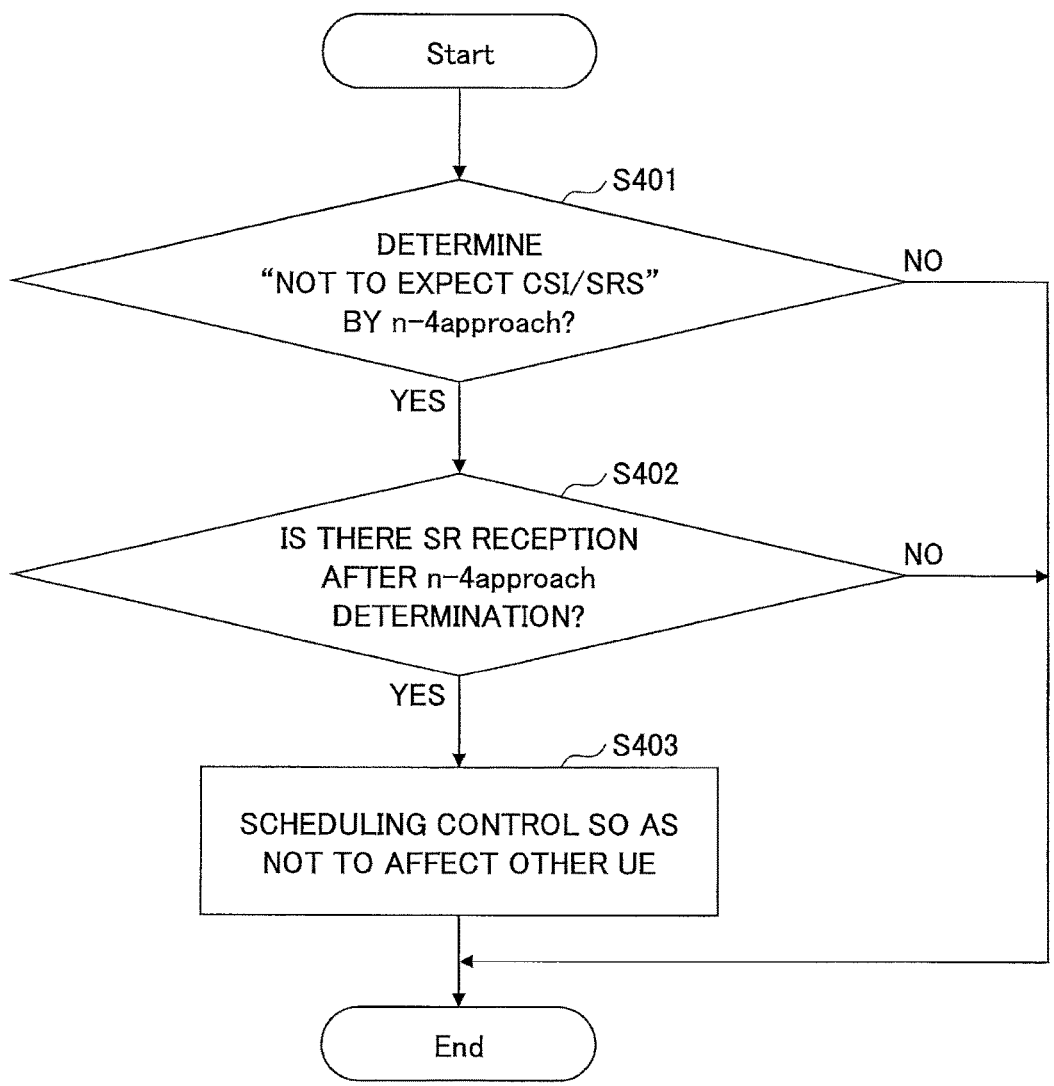

MOBILE STATION, BASE STATION, MOBILE COMMUNICATION SYSTEM, TRANSMISSION CONTROL METHOD, AND RECEPTION CONTROL METHOD

CROSS-REFERENCE TO RELATED APPLICATIONS

This application is a national stage application of PCT/JP2014/062191 filed May 2, 2014, which claims priority to Japanese Priority Application No. 2013-099326 filed on May 9, 2013, the entire contents of which are hereby incorporated by reference.

TECHNICAL FIELD

The present invention relates to a mobile station and a base station in a mobile communication system such as LTE. More particularly, the present invention relates to a technique for controlling transmission and reception of signals between a mobile station and a base station in a mobile communication system to which DRX control is applied.

RELATED ART

In LTE (Long Term Evolution) that is standardized in 3GPP (3rd Generation Partnership Project), from the viewpoint of suppressing battery consumption of the mobile station (UE), DRX (Discontinuous Reception) control is adopted (refer to non-patent document 1, for example) in which, when there is no data to be transmitted/received by the mobile station for equal to or greater than a predetermined period, the mobile station discontinuously receives a downlink control channel (PDCCH: Physical Downlink Control Channel) transmitted by the base station (eNB) only in a particular period. More particularly, the mobile station is managed as an Active state or an Inactive state based on RRC Connected of the mobile station changed to a DRX state by the DRX control.

The mobile station in an Active state monitors PDCCH, and transmits, to the base station, CSI (Channel State Information: channel state information)/SRS (Sounding Reference Signal: reference signal for measuring uplink channel quality) (in other words, the mobile station performs CSI/SRS reporting). CSI includes channel quality information (CQI), precoding matrix indicator (PMI), rank indicator (RI) and the like.

On the other hand, the mobile station in an Inactive state does not monitor PDCCH and does not transmit CSI/SRS so that battery consumption of the mobile station can be reduced. The time in an Active state is also referred to as Active Time.

As one of triggers for the mobile station to enter an Inactive state, there is a case in which drx-InactivityTimer expires. As another trigger of transition to an Inactive state, there is a case in which the mobile station receives DRX command MAC Control Element (to be referred to as "DRX command MAC CE" hereinafter) transmitted by the base station (when the mobile station receives DRX command MAC CE, drx-InactivityTimer stops forcibly). On the other hand, as a trigger for the mobile station to enter an Active state, there is a case in which, when uplink user data occurs in the mobile station, the mobile station transmits, to the base station, a scheduling request (to be referred to as SR hereinafter) for requesting scheduling of the mobile station for uplink.

RELATED ART DOCUMENT

Non-Patent Document

Non-Patent Document 1: 3GPP TS 36.321
Non-Patent Document 2: 3GPP Specification Change Request records for 36.321; R2-130844

SUMMARY

However, there are following problems in the above-mentioned processes on CSI/SRS in the conventional DRX control.

First, there is a problem in which, when Active Time is suddenly extended in the mobile station in an Active state, the mobile station cannot transmit CSI/SRS(CSI or SRS), and when Active Time suddenly ends, the mobile station cannot stop transmission of CSI/SRS. As to the base station, since such cases may occur in which CSI/SRS is transmitted or not transmitted from the mobile station, there is a problem in that process load for supporting both cases increases. Here, an example of this event is described more concretely using FIGS. 1A and 13.

FIG. 1A is a diagram showing operation of the mobile station and the base station in DRX control. In FIGS. 1A and 1B, "n" ("n−3"-"n+9") indicates a subframe (subframe: 1 ms). As shown in FIG. 1A, first, in the mobile station, drx-InactivityTimer is started (S11). Next, the base station transmits DRX command MAC CE to the mobile station to change a DRX state of the mobile station to an Inactive state (S12). The mobile station that receives DRX command MAC CE stops the running drx-InactivityTimer to end an Active Time (S13).

In the mobile station, since the Active Time suddenly ends at the reception of DRX command MAC CE, there is a possibility that the mobile station cannot stop transmission of CSI/SRS immediately. Therefore, the mobile station transmits CSI/SRS to the base station (S14). On the other hand, the base station does not ascertain whether the mobile station to which DRX command MAC CE has been transmitted in step S12 stops transmission process of CSI/SRS. That is, there is a problem in that mismatch (inconsistency) occurs since expected operation for the process on CSI/SRS is different between the base station and the mobile station or operation of CSI/SRS process cannot be specified with each other.

The occurrence of the mismatch has an effect in which, for example, when CSI/SRS is not transmitted from the mobile station while the base station expects transmission of CSI/SRS from the mobile station, the base station decodes noise and interference and the like in the process of estimation of link quality of the mobile station to estimate the quality based on them so that estimation accuracy deteriorates. On the other hand, for example, when CSI/SRS is transmitted from the mobile station while the base station does not expect transmission of CSI/SRS from the mobile station, there is an effect in which, the CSI/SRS collides with an uplink (UL) signal transmitted from another mobile station so that interference occurs.

Thus, in order to avoid occurrence of the above-mentioned mismatch, a process (to be referred to as "n−4approach") is disclosed (refer to non-patent document 2, for example) for estimating a state of the mobile station after elapse of 4 ms based on a state and information (in an Active state or not, for example) of the mobile station in each time (subframe(TTI)) so as to determine whether to transmit CSI/SRS after the elapse of 4 ms. In this case, even though an event for changing a state of the mobile station at the time point of subframe "n" occurs in a period from the time point of "n−4" until subframe "n" corresponding to elapse of 4 ms, whether to transmit CSI/SRS at the time point of subframe "n" is controlled based on determination at the time point of subframe "n−4".

In the n−4approach, in a case where the state (estimated state) of the mobile station after elapse of 4 ms (that is, subframe "n") that is estimated at the time point of subframe "n−4" is an Active state, the mobile station performs a transmission process of CSI/SRS at the time point of subframe "n", and the base station performs a reception process. On the other hand, in a case where the estimated state of the mobile station after elapse of 4 ms (that is, subframe "n") that is estimated at the time point of subframe "n−4" is not an Active state (is an Inactive state), the mobile station does not perform the transmission process of CSI/SRS at the time point of subframe "n", and the base station does not perform the reception process.

Next, concrete operation by the n−4approach is described based on FIG. 1B. FIG. 1B is a diagram showing operation of the mobile station and the base station in the DRX control when n−4approach is applied. As shown in FIG. 1B, as a determination process of n−4approach, the mobile station determines whether to perform a transmission process of CSI/SRS after 4 ms (subframe "n+2") based on an estimated state after 4 ms at the time point of subframe "n−2" (S11a). In the example of FIG. 1B, the mobile station can estimate, at the time point of subframe "n−2", that the state after 4 ms is an Active time, that is, an Active state. Thus, the mobile station is controlled so as to transmit CSI/SRS at the time point of subframe "n+2". Similarly, the base station determines whether to perform a transmission process of CSI/SRS after 4 ms (subframe "n+2") based on the estimated state after 4 ms at the time point of subframe "n−2" (n1b).

In the example of FIG. 1B, since the base station does not transmit DRX command MAC CE at the time point of subframe "n−2", the base station determines that the state of the mobile station at subframe "n+2 is an Active state, and the base station is controlled so as to try to receive CSI/SRS at the time point of subframe "n+2". Then, the mobile station transmits CSI/SRS to the base station based on the determination result in step S11a (S14). Accordingly, by applying n−4approach in the DRX control, whether to perform transmission/reception process of CSI/SRS in the mobile station/base station at the time point of subframe "n+4" is determined based on the state of the mobile station at the time point of subframe "n". Thus, occurrence of mismatch like the case of FIG. 1A can be avoided.

However, when transmission process of Scheduling Request(SR) is performed in DRX control, there is a case where the above-mentioned problem is not solved even though n−4approach is applied. Concrete operation is described with reference to FIGS. 2A and 2B. FIGS. 2A and 2B are diagrams showing operation of the mobile station and the base station when SR is triggered in DRX control to which n−4approach is applied.

FIG. 2A shows operation in a case where CSI/SRS transmission (reception) determination process by n−4approach is performed after SR is triggered in the mobile station. After the trigger of SR in the mobile station, SR is transmitted from the mobile station to the base station after elapse of a predetermined time. First, SR is triggered in the mobile station (S21). After that, the base station transmits DRX command MAC CE to the target mobile station to change a DRX state of the mobile station to an Inactive state (S22). Next, as an determination process of n−4approach, the mobile station determines, based on a state at the time point of subframe "n", whether to perform a transmission process of CSI/SRS after 4 ms (subframe "n+4") (S23).

In the example of FIG. 2A, since the mobile station receives DRX command MAC CE at the time point of subframe "n", Active time ends. However, since SR has been triggered at the time point of subframe "n−3" (before determination process of n−4approach), change to an Active state after transmission of SR is scheduled so that the mobile station is controlled so as to perform transmission process of CSI/SRS. Similarly, the base station determines, based on a state at the time point of subframe "n", whether to perform a reception process of CSI/SRS after 4 ms (subframe "n+4") (S24). In the example of FIG. 2A, since the base station transmits DRX command MAC CE at the time point of subframe "n", the base station determines that a state of the mobile station is not an Active state, so that the base station is controlled so as not to expect transmission of CSI/SRS from the mobile station at the time point of subframe "n+4".

Next, SR is transmitted from the mobile station to the base station based on the trigger in step S21 (S25). Then, the mobile station transmits CSI/SRS to the base station based on the determination process of step S23 (S26). On the other hand, the base station has been controlled so as not to expect transmission of CSI/SRS from the mobile station based on the determination process of step S24. However, since the base station receives SR at the time point of subframe "n+2", it is uncertain whether to expect or not transmission of CSI/SRS from the mobile station. That is, a problem may occur in which mismatch occurs since expected operation on transmission/reception process of CSI/SRS is different between the mobile station and the base station, or operation of CSI/SRS reporting cannot be specified.

On the other hand, FIG. 2B shows operation in a case where SR is triggered in the mobile station after CSI/SRS transmission (reception) determination process is performed based on n−4approach. In this case, as a determination process of n−4approach, the mobile station determines, based on a state at the time point of subframe "n", whether to perform a transmission process of CSI/SRS after 4 ms (subframe "n+4") (S32).

In the example of FIG. 2B, since the mobile station receives DRX command MAC CE at the time point of subframe "n", the mobile station ends an Active Time, and performs control so as not to perform a transmission process of CSI/SRS. After that, SR is triggered in the mobile station (S34), and SR is transmitted (S35). Therefore, the mobile station cannot detect, at the time point (subframe "n") when the determination process by n−4approach is performed, that change to an Active state based on SR transmission is scheduled. Thus, CSI/SRS is not transmitted from the mobile station (S36). Operation of the base station is similar to that in the case of FIG. 2A. Therefore, there is a case where a problem similar to that in FIG. 2A occurs.

The present invention is contrived in view of the above-mentioned points, and an object of the present invention is to avoid occurrence of mismatch of operation between a mobile station that transmits CSI/SRS that is quality information and a base station that expects. CSI/SRS in a mobile communication system to which DRX control is applied.

In one or more embodiments, a mobile station of the present invention is configured as a mobile station that communicates with a base station, including:

means that determines whether to transmit, to the base station, quality information indicating radio quality when a predetermined time elapses based on a state, of the mobile station, which is an active state or not in discontinuous reception control; and means that, even when it is determined not to transmit the quality information based on the determination, transmits the quality information when the predetermined time elapses in a case where a scheduling request is transmitted to the base station before the predetermined time elapses.

Also, a mobile station of the present invention can be configured as a mobile station that communicates with a base station, including:

means that determines whether to transmit, to the base station, quality information indicating radio quality when a predetermined time elapses based on a state, of the mobile station, which is an active state or not in discontinuous reception control; and means that controls transmission of the quality information based on a determination result of the determination; and wherein, when it is determined not to transmit the quality information based on the determination, the mobile station does not transmit the quality information even when a scheduling request is transmitted from the mobile station.

A base station of the present invention can be configured as a base station that communicates with a mobile station, including:

means that determines whether to expect quality information indicating radio quality that is transmitted from the mobile station when a predetermined time elapses based on a state, of the mobile station, which is an active state or not in discontinuous reception control; and control means that, when receiving a scheduling request from the mobile station before the predetermined time elapses after it is determined not to expect the quality information based on the determination, performs control so as not to expect first quality information to be transmitted from the mobile station after receiving the scheduling request.

According to one or more embodiments of the present invention, even when a scheduling request is transmitted from a mobile station to a base station in a mobile communication system to which DRX control is applied, it becomes possible to avoid occurrence of mismatch of operation between the mobile station that transmits CSI/SRS that is quality information and the base station that expects CSI/SRS.

BRIEF DESCRIPTION OF THE DRAWINGS

FIG. 1A is a diagram showing operation of a mobile station and a base station in DRX control;

FIG. 1B is a diagram showing operation of a mobile station and a base station in DRX control;

FIG. 2A is a diagram showing operation of a mobile station and a base station in a case where SR is triggered in DRX control to which n−4approach is applied;

FIG. 2B is a diagram showing operation of a mobile station and a base station in a case where SR is triggered in DRX control to which n−4approach is applied;

FIG. 6A is a diagram showing process content in a first embodiment;

FIG. 8A is a diagram showing process content in a second embodiment;

FIG. 8B is a diagram showing process content in the second embodiment;

FIG. 10A is a diagram showing process content in a third embodiment;

FIG. 11 is a flowchart showing a process procedure example of a base station eNB in the third embodiment.

DETAILED DESCRIPTION

In the following, embodiments of the present invention (to be referred to as embodiments of the present invention hereinafter) are described with reference to figures. The embodiments described below are merely examples, and the embodiments to which the present invention is applied are not limited to the embodiments below. For example, in the following, LTE is used as an example of a mobile communication system, the present invention can be also applied to systems that are not limited to LTE.

[System Configuration]

Figure 3:
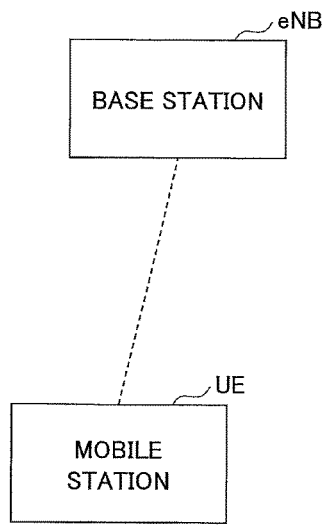
FIG. 3 is a block diagram of a mobile communication system in an embodiment of the present invention.

FIG. 3 is a block diagram of a mobile communication system in an embodiment of the present invention. As shown in FIG. 3, the mobile communication system in the embodiment of the present invention is a communication system of an LTE scheme, and includes a base station eNB and a mobile station UE.

The base station eNB transmits, to the mobile station UE, PDCCH, PDSCH, P-HICH(Physical HARQ Indicator Channel) and the like.

Also, the mobile station UE transmits, to the base station eNB, PUSCH (Physical Uplink Shared Channel), PUCCH, and PRACH (Physical Random Access Channel).

The base station eNB transmits, to the mobile station UE, downlink information (downlink user data, for example) via DL-SCH mapped to PDSCH. The mobile station UE transmits, to the base station eNB, uplink information (uplink user data, for example) via UL-SCH mapped to PUSCH.

Also, the mobile station UE transmits, to the base station eNB, control information such as "Scheduling Request (SR)" defined in 3GPP.

[Functional Configuration]

<Mobile Station UE>

Figure 4:
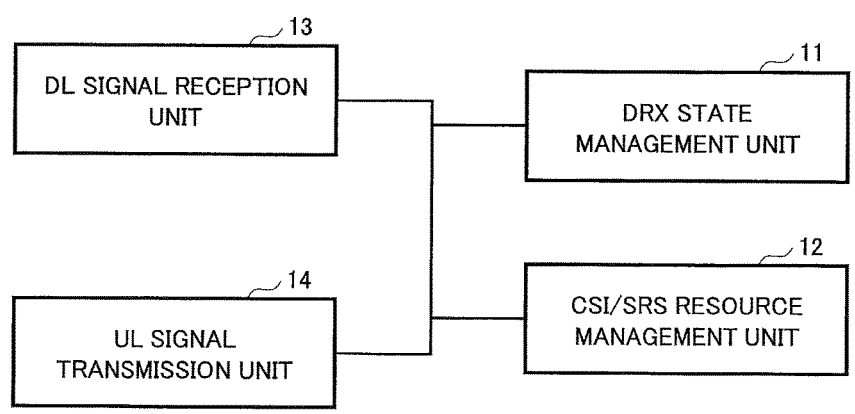
FIG. 4 is a functional block diagram of a mobile station UE in an embodiment of the present invention.

FIG. 4 shows a functional block diagram of the mobile station UE in an embodiment of the present invention. As shown in FIG. 4, the mobile station UE includes a DRX state management unit 11, a CSI/SRS resource management unit 12, a DL signal reception unit 13, and an UL signal transmission unit 14. FIG. 4 shows only functional units especially related to the present invention in the mobile station UE, and the mobile station UE also includes at least functions, not shown in the figure, for performing operation complying with the LTE scheme.

The DRX state management unit 11 manages whether the mobile station is in a DRX (discontinuous reception) state or not in DRX control. Also, the DRX state management unit 11 manages RRC Connected of the mobile station UE that has changed to a DRX state as an Active state or an Inactive state.

The DRX state management unit 11 manages the mobile station UE as an Active state in the following cases (1)-(4).

(1) A case where any one of On duration Timer, drx-InactivityTimer, drx-RetransmissionTimer, and mac-contentionResolutionTimer is running;

(2) A case where Scheduling Request (SR) is transmitted;

(3) A case where UL grant is assigned for UL HARQ retransmission;

(4) A case where Random Access Response is received, and after that, PDCCH for instructing new transmission is not received.

In addition, in a DRX state, the DRX state management unit 11 determines, based on a determination process of n−4approach, whether to transmit CSI or SRS (CSI/SRS) that is quality information indicating radio quality after elapse of a predetermined time (subframe "n+4") from a current time point (subframe "n", for example). In the determination process of n−4approach, it is determined whether the mobile station UE is in an Active state or not based on the determination criteria of the above-mentioned (1)-(4). In the Active state determination for the mobile station UE in the determination process of n−4approach, the above-mentioned (2) includes a case where SR is actually transmitted, and a case where SR is triggered (from a time when SR is triggered until SR is transmitted). In an after-mentioned second embodiment, the above-mentioned (2) is excluded from determination criteria used for Active state determination in the determination process of n−4approach.

The CSI/SRS resource management unit 12 assigns a resource for CSI/SRS transmission from resources for PUCCH.

The DL signal reception unit 13 receives DRX command MAC CE and the like transmitted by the base station eNB via DL-SCH. Then, the DL signal reception unit 13 outputs a received DRX command MAC CE to the DRX state management unit 11.

The UL signal transmission unit 14 transmits, to the base station eNB, SR and CSI/SRS and the like via PUCCH.

The DL signal reception unit 13 and the UL signal transmission unit 14 perform transmission and reception processes of control data (C-plane data) and user data (U-Plane data) other than the above-mentioned signals.

<Base Station eNB>

Figure 5:
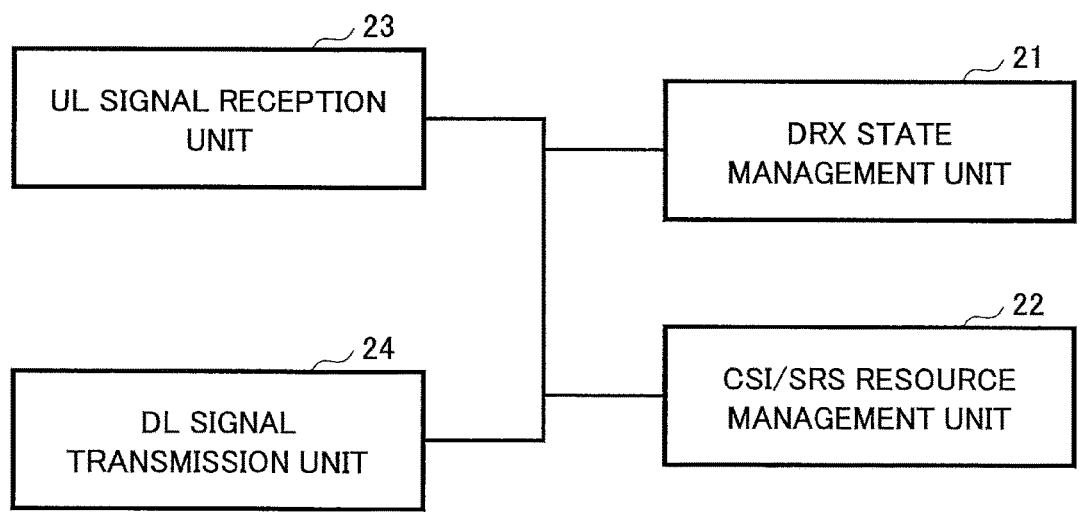
FIG. 5 is a functional block diagram of a base station eNB in an embodiment of the present invention.

FIG. 5 is a functional block diagram of the base station eNB in an embodiment of the present invention. As shown in FIG. 5, the base station eNB includes a DRX state management unit 21, a CSI/SRS resource management unit 22, an UL signal reception unit 23 and a DL signal transmission unit 24. FIG. 5 shows only functional units especially related to the present invention in the base station eNB, and the base station eNB also includes at least functions, not shown in the figure, for performing operation complying with the LTE scheme.

The DRX state management unit 21 manages whether the mobile station UE under the base station eNB is in a DRX state or not in DRX control. More particularly, the DRX state management unit 21 manages the mobile station UE which is a transmission destination as Active/Inactive state based on transmission of DRX command MAC CE for changing the mobile station UE into an Inactive state, reception of SR transmitted from the mobile station UE, and the like.

In addition, the DRX state management unit 21 determines, based on a determination process of n−4approach, whether to expect transmission of CSI/SRS from the mobile station UE, that is, whether to try to receive CSI/SRS.

The CSI/SRS resource management unit 22 assigns a resource for CSI/SRS reception from resources for PUCCH.

The UL signal reception unit 23 receives SR, CSI/SRS and the like transmitted from the mobile station UE via PUCCH.

The DL signal transmission unit 24 transmits, to the base station eNB, DRX command MAC CE and the like via DL-SCH. The DL signal transmission unit 24 includes a scheduler function.

The UL signal reception unit 23 and the DL signal transmission unit 24 perform transmission and reception processes of control data and user data other than the above-mentioned signals.

[Process Content]

In the embodiment of the present invention, three control methods are proposed on CSI/SRS in DRX control. In the following, three control methods are described as first to third embodiments respectively.

First Embodiment

In the first embodiment, the mobile station performs control such that, even though it is determined "not to transmit CSI/SRS" based on the determination process of n−4approach in the mobile station UE, the mobile station UE transmits CSI/SRS if SR is transmitted after the determination process. That is, the mobile station UE transmits CSI/SRS when SR is transmitted irrespective of the determination result of n−4approach. On the other hand, the base station eNB performs control so as to "always expect (try reception process of) CSI/SRS" from the mobile station UE after receiving SR from the mobile station UE.

Figure 6B:
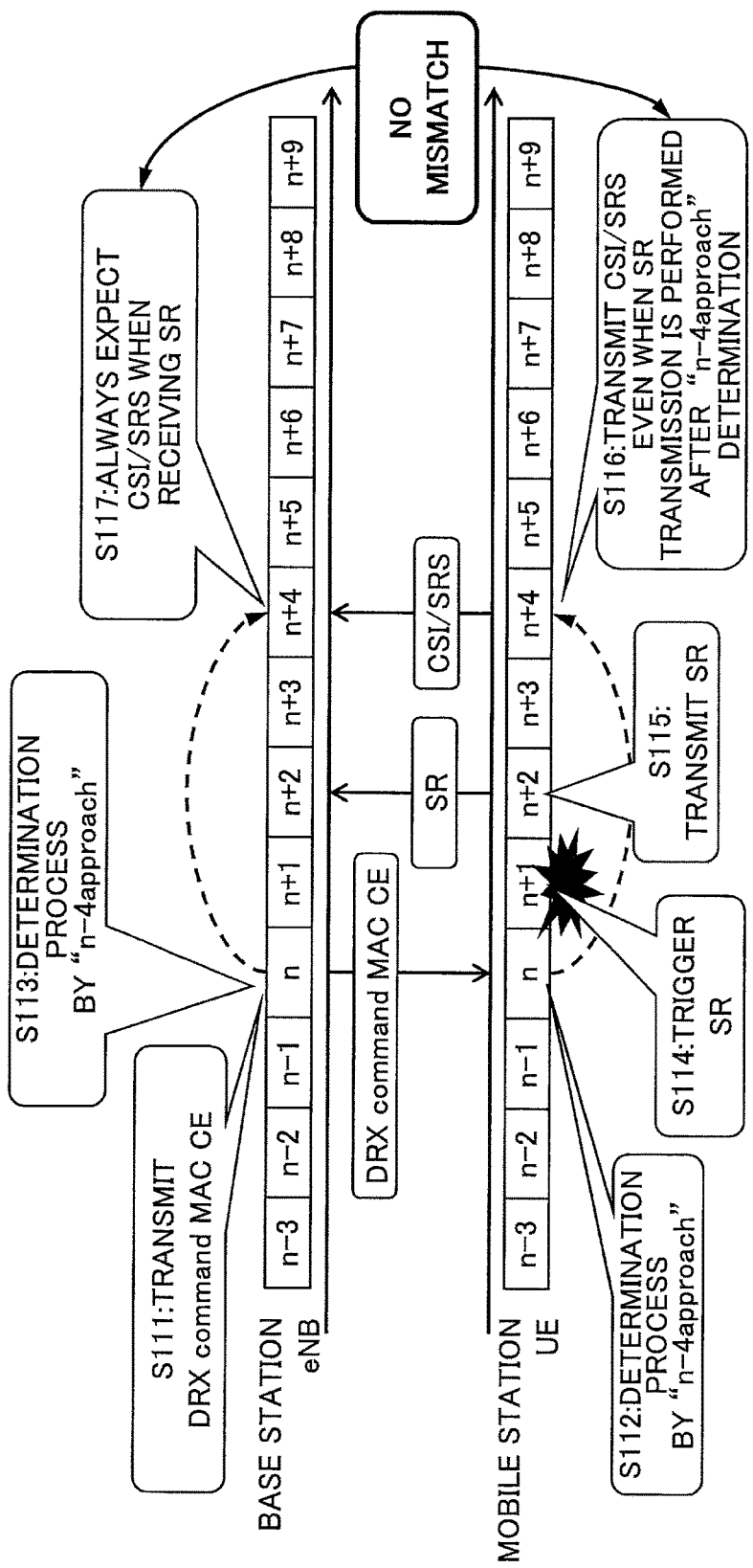
FIG. 6B is a diagram showing process content in the first embodiment.

With reference to FIGS. 6A and 6B, concrete process content in the first embodiment is described. FIG. 6A shows process content in a case where SR is triggered before a determination process of n−4approach is performed in the mobile station UE. FIG. 6B shows process content in a case where SR is triggered after a determination process of n−4approach is performed in the mobile station UE.

<A Case where SR is Triggered Before n−4Approach Determination (FIG. 6A)>

In FIG. 6A, first, SR is triggered in the mobile station (S101).

Next, the DRX state management unit 21 of the base station eNB generates DRX command MAC CE for changing a DRX state of the mobile station UE to an Inactive state, and transmits the generated DRX command MAC CE to the target mobile station UE via the DL signal transmission unit 24 (S102).

Next, the DL signal reception unit 13 of the mobile station UE receives the DRX command MAC CE transmitted from the base station eNB, and outputs the received DRX command MAC CE to the DRX state management unit 11. The DRX state management unit 11 performs a determination process of n−4approach based on a state (Active/Inactive state) at the time point of subframe "n" for determining whether to transmit CSI/SRS in subframe "n+4" or not (S103).

More particularly, the DRX state management unit 11 ends an Active Time since it receives DRX command MAC CE at the time point subframe "n". But, since SR has been triggered at the time point of subframe "n−3" (before determination process of n−4approach), the DRX state management unit 11 determines "to transmit CSI/SRS". The determination process of n−4approach by the DRX state management unit 11 is performed in each subframe.

Similarly, the DRX state management unit 21 of the base station eNB performs a determination process of n–4approach (S104). More particularly, since DRX command MAC CE has been transmitted in step S102, the DRX state management unit 21 determines that the state of the mobile station UE is not an Active state, so as to determine "not to expect CSI/SRS" from the mobile station UE at the time point of subframe "n+4".

Next, the UL signal transmission unit 14 of the mobile station UE transmits, to the base station eNB, SR based on the trigger in step S101 (S105), and notifies the DRX state management unit 11 that a transmission process of SR is executed. Also, the UL signal reception unit 23 of the base station eNB receives SR transmitted from the mobile station UE, and notifies the DRX state management unit 21 of the reception of SR.

Then, the CSI/SRS management unit 12 of the mobile station UE controls the CSI/SRS resource management unit 12 based on the result of determination performed in step S103 (to transmit CSI/SRS) so as to transmit CSI/SRS to the base station eNB (S106).

On the other hand, although the DRX state management unit 21 of the base station eNB determines "not to expect CSI/SRS" from the mobile station UE in step S104, the DRX state management unit 21 controls the CSI/SRS resource management unit 22 so as "to always expect CSI/SRS after SR reception" in a case where SR is received beforehand (S107).

Therefore, mismatch does not occur between the mobile station UE and the base station eNB for the process of CSI/SRS.

<A Case where SR is Triggered after n–4Approach Determination (FIG. 6B)>

In FIG. 6B, the DRX state management unit 21 of the base station eNB generates DRX command MAC CE, and transmits the generated DRX command MAC CE to the target mobile station UE via the DL signal transmission unit 24 (S111).

Next, the DL signal reception unit 13 of the mobile station UE receives the DRX command MAC CE transmitted from the base station eNB, and outputs the received DRX command MAC CE to the DRX state management unit 11. The DRX state management unit 11 performs a determination process of n–4approach (S112). More particularly, the DRX state management unit 11 determines "not to transmit CSI/SRS" at the time point of subframe "n+4" since the state is not an Active state due to the reception of DRX command MAC CE at the time point of subframe "n".

Similarly, the DRX state management unit 21 of the base station eNB performs a determination process of n–4approach (S113). More particularly, since DRX command MAC CE has been transmitted in step S101, the DRX state management unit 21 determines that the state of the mobile station UE is not an Active state, so as to determine "not to expect CSI/SRS" from the mobile station UE at the time point of subframe "n+4".

At this time, SR is triggered in the mobile station UE (S114), so that SR based on the trigger is transmitted to the base station eNB by the UL signal transmission unit 14 (S115). The UL signal transmission unit 14 notifies the DRX state management unit 11 that transmission process of SR has been executed. Also, the UL signal reception unit 23 of the base station eNB receives SR transmitted from the mobile station UE, and notifies the DRX state management unit 21 of the reception of SR.

Then, although the DRX state management unit 11 of the mobile station UE determines "not to transmit CSI/SRS" in step S112, it controls the CSI/SRS resource management unit 12 so as "to transmit CSI/SRS" since SR is transmitted in step S115 (S116).

On the other hand, although the DRX state management unit 21 of the base station eNB determines "not to expect CSI/SRS" from the mobile station UE in step S113, the DRX state management unit 21 controls the CSI/SRS resource management unit 22 so as "to always expect CSI/SRS after SR reception" in a case where SR is received beforehand (S117).

Therefore, mismatch does not occur between the mobile station UE and the base station eNB for the process of CSI/SRS.

<Flowchart (Process Procedure of the Mobile Station UE)>

Figure 7:
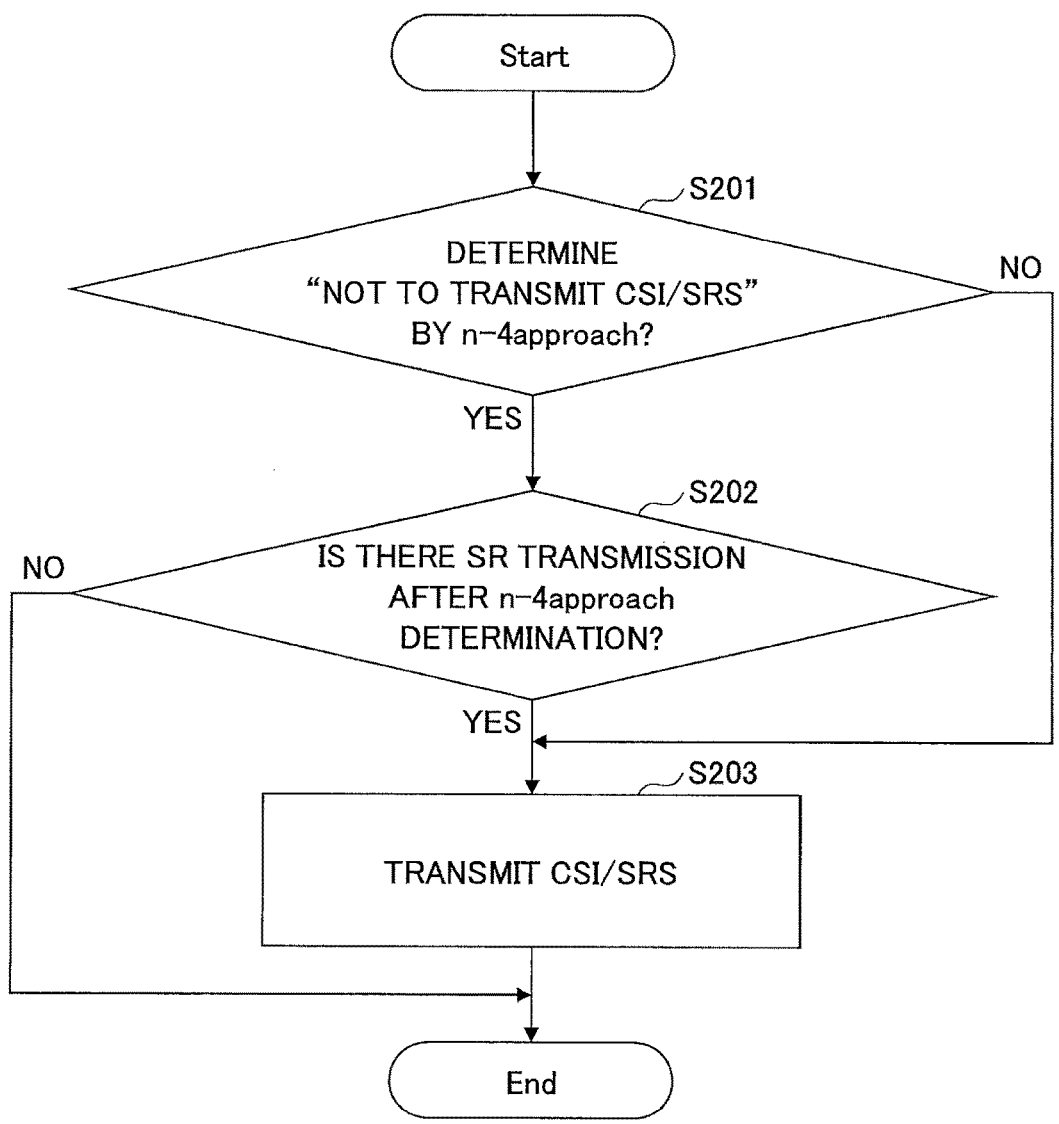
FIG. 7 is a flowchart showing a process procedure example of a mobile station UE in the first embodiment.

Next, a process procedure example of the mobile station UE in the first embodiment is described base on the flowchart diagram shown in FIG. 7. FIG. 7 is a flowchart diagram showing a process procedure per 1 subframe, and is described as a process at a time point of subframe "n+4", for example.

First, the DRX state management unit 11 of the mobile station UE determines whether the determination result by n–4approach performed at the time point of subframe "n" is "not to transmit CSI/SRS" at the time point of subframe "n+4" (S201).

If it is determined "not to transmit CSI/SRS" at the time point of subframe "n+4" (Yes in step S201), it is determined whether SR transmission has been performed from the subframe "n" when the determination process of n–4approach was performed until subframe "n+4" (S202).

If it is determined that transmission of SR has been performed after the determination process of n–4approach (Yes in step S202), or if it is not determined "not to transmit CSI/SRS" at the time point of subframe "n+4" (No in step S201), the DRX state management unit 11 controls the CSI/SRS resource management unit 12 to transmit CSI/SRS to the base station eNB (S203).

On the other hand, if it is determined that SR has not been performed after the determination process of n–4approach (No in step S202), CSI/SRS is not transmitted.

As mentioned above, according to the first embodiment, irrespective of the timing (order) of the trigger of SR and the determination process of n–4approach, when SR is transmitted from the mobile station UE (when SR is received by the base station eNB), the mobile station UE is controlled so as to transmit CSI/SRS and the base station eNB is controlled so as to expect transmission of CSI/SRS from the mobile station UE. Therefore, occurrence of mismatch of the process of CSI/SRS in the mobile station UE and the base station eNB can be avoided.

Second Embodiment

In the second embodiment, the mobile station performs control such that, even though SR is transmitted from the mobile station UE after it is determined "not to transmit CSI/SRS" based on the determination process of n–4approach in the mobile station UE, the mobile station UE does not transmit CSI/SRS. For realizing the control in the second embodiment, the above-mentioned (2) "a case where SR is transmitted" is excluded from determination criteria used for Active state determination of the mobile station UE in the determination process of n–4approach by the mobile station UE. On the other hand, even though the base station eNB receives SR from the mobile station UE after it is determined "not to expect CSI/SRS" from the mobile station UE based on the determination process of n-4approach, the base station eNB performs control so as "not to expect CSI/SRS (not to try reception process)".

With reference to FIGS. 8A and 8B, concrete process content in the second embodiment is described. FIG. 8A shows process content in a case where SR is triggered before a determination process of n-4approach is performed in the mobile station UE. FIG. 8B shows process content in a case where SR is triggered after a determination process of n-4approach is performed in the mobile station UE. In FIGS. 8A and 8B, the same processes as those of FIGS. 6A and 6B are assigned the same step numbers, and detailed descriptions for these are not provided.

<A Case where SR is Triggered Before n-4Approach Determination (FIG. 8A)>

In FIG. 8A, the DRX state management unit 11 of the mobile station UE performs determination process of n-4approach in a subframe "n" (S103a). In the second embodiment, the above-mentioned (2) "a case where SR is transmitted (including a state from a time when SR is triggered until SR is transmitted)" is excluded from determination criteria used for Active state determination of the mobile station UE in the determination process of n-4approach. More specifically, although SR has been triggered in step S101, the DRX state management unit 11 determines "not to transmit CSI/SRS" since "a case where SR is transmitted (including a state from a time when SR is triggered until SR is transmitted)" is excluded from the determination criteria for Active state determination in n-4approach.

Then, the CSI/SRS management unit 12 of the mobile station UE controls the CSI/SRS resource management unit 12 so as not to transmit CSI/SRS based on the result of determination performed in step S103a ("not to transmit CSI/SRS") (S106a).

On the other hand, the DRX state management unit 21 of the base station eNB controls the CSI/SRS resource management unit 22 so as "not to expect CSI/SRS" which is the normal determination result by n-4approach (S107a).

Therefore, mismatch does not occur between the mobile station UE and the base station eNB for the process of CSI/SRS.

<A Case where SR is Triggered after n-4Approach Determination (FIG. 8B)>

In FIG. 8B, at a subframe "n", the DRX state management unit 11 of the mobile station UE performs determination process of n-4approach (excluding "a case where SR is transmitted (including a state from a time when SR is triggered until SR is transmitted)" from the determination criteria for Active state determination) (S112a). More specifically, since the mobile station UE is not in an Active state due to reception of DRX command MAC CE at the time point of subframe "n", the DRX state management unit 11 determines "not to transmit CSI/SRS" at the time point of subframe "n+4".

Then, the CSI/SRS management unit 11 of the mobile station UE controls the CSI/SRS resource management unit 12 so as "not to transmit CSI/SRS" based on the result of "not to transmit CSI/SRS" determined in step S112a (S116a).

On the other hand, the DRX state management unit 21 of the base station eNB controls the CSI/SRS resource management unit 22 so as "not to expect CSI/SRS" which is the normal determination result by n-4approach (S117a).

Therefore, mismatch does not occur between the mobile station UE and the base station eNB for the process of CSI/SRS.

<Flowchart (Process Procedure of the Mobile Station UE)>

Figure 9:
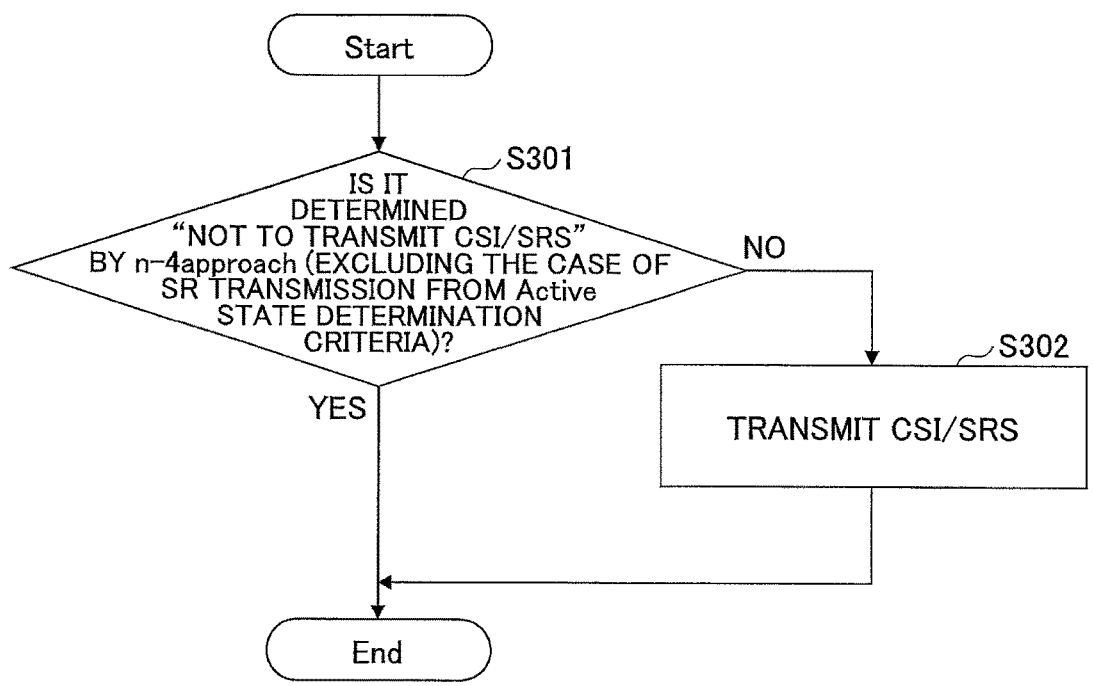
FIG. 9 is a flowchart showing a process procedure example of a mobile station UE in the second embodiment.

Next, a process procedure example of the mobile station UE in the second embodiment is described base on the flowchart diagram shown in FIG. 9. FIG. 9 is a flowchart diagram showing a process procedure per 1 subframe, and is described as a process at a time point of subframe "n+4", for example.

First, the DRX state management unit 11 of the mobile station UE determines whether the determination result by n-4approach performed at the time point of subframe "n" (excluding "a case where SR is transmitted (including a state from a time when SR is triggered until SR is transmitted)" from the determination criteria for Active state determination) is "not to transmit CSI/SRS" at the time point of subframe "n+4" (S301).

If it is not determined "not to transmit CSI/SRS" at the time point of subframe "n+4" (No in step S301), that is, if it is determined "to transmit CSI/SRS", the DRX state control unit 11 controls the CSI/SRS resource management unit 12 so as to transmit CSI/SRS to the base station eNB (S302).

On the other hand, if it is determined "not to transmit CSI/SRS" at the time point of subframe "n+4" (Yes in step S301), CSI/SRS is not transmitted.

As mentioned above, according to the second embodiment, by excluding "a case where SR is transmitted (including a state from the time when SR is triggered until SR is transmitted)" from the Active determination criteria in the determination process of n-4approach in the mobile station UE, mismatch occurrence of processes on CSI/SRS between the mobile station UE and the base station eNB can be avoided irrespective of the timing (order) between the trigger of SR and the determination process of n-4approach.

Third Embodiment

In the third embodiment, even though SR is received after it is determined "not to expect CSI/SRS" from the mobile station UE based on the determination process of n-4approach in the base station eNB, the base station eNB performs control so as not to try (so as to neglect) reception of the first CSI/SRS transmitted by the mobile station UE after receiving SR.

The first CSI/SRS transmitted by the mobile station UE after receiving SR is CSI/SRS arriving at the base station eNB initially or until predetermined time (20 ms, for example) elapses after the base station eNB receives SR. Also, "control so as not to try (so as to neglect) reception of CSI/SRS" in the third embodiment is, for example, control for performing scheduling so as not to assign resources to other mobile stations UE such that an influence is not exerted on other mobile stations UE when CSI/SRS from the mobile station UE arrives at the base station eNB. For example, UL resources are assigned such that UL resources used for UL transmission of other mobile stations UE do not collide with an (time, frequency) UL resource used for transmission of CSI/SRS by the mobile station UE. On the other hand, the mobile station UE can arbitrarily decide whether to transmit CSI/SRS after transmission of SR.

Figure 10B:
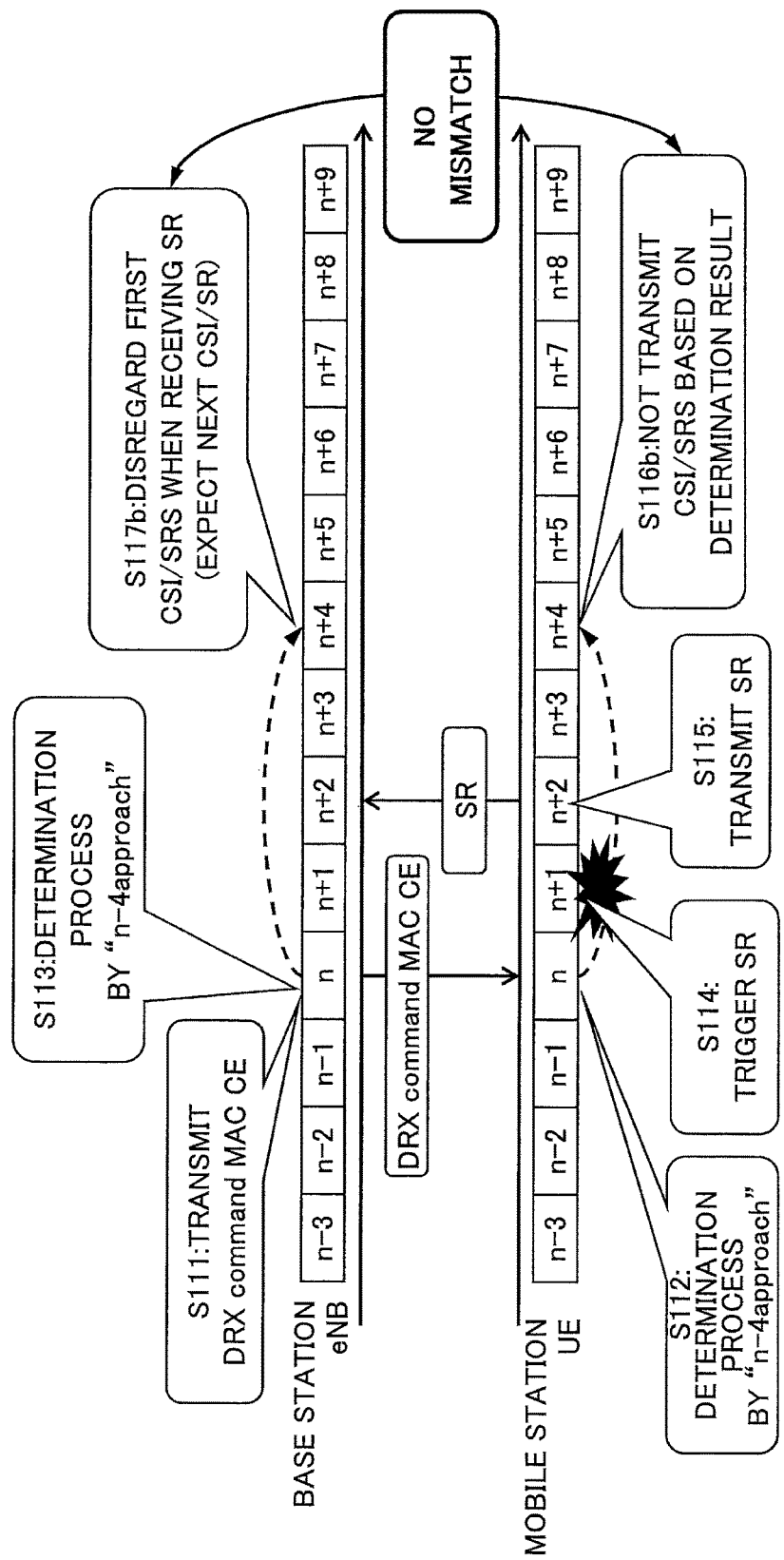
FIG. 10B is a diagram showing process content in the third embodiment.

With reference to FIGS. 10A and 10B, concrete process content in the third embodiment is described. FIG. 10A shows process content in a case where SR is triggered before a determination process of n-4approach is performed in the mobile station UE. FIG. 10B shows process content in a case where SR is triggered after a determination process of n-4approach is performed in the mobile station UE. In FIGS. 10A and 10B, the same processes as those of FIGS. 6A and 6B are assigned the same step numbers, and detailed descriptions for these are not provided.

<A Case where SR is Triggered Before n−4Approach Determination (FIG. 10A)>

In FIG. 10A, based on the result of determination performed in step S103a ("to transmit CSI/SRS"), the CSI/SRS management unit 12 of the mobile station UE controls the CSI/SRS resource management unit 12 so as to transmit CSI/SRS to the base station eNB (S106b). As mentioned above, control (whether to transmit or not) of transmission process of CSI/SRS can be arbitrarily determined when transmission of SR or trigger of SR is performed.

On the other hand, since the DRX state management unit 21 of the base station eNB receives SR after determining "not to expect CSI/SRS" from the mobile station UE in step S104, the DRX state management unit 21 neglects the first CSI/SRS transmitted from the mobile station after receiving SR and controls the CSI/SRS resource management unit 22 so as to perform scheduling such that an influence is not exerted on other mobile stations UE (S107b).

In this case, although mismatch on processes of CSI/SRS occurs between the mobile station UE and the base station eNB, control can be performed such that an influence is not exerted on other mobile stations UE by scheduling control on CSI/SRS by the base station eNB.

<A Case where SR is Triggered after n−4Approach Determination (FIG. 10B)>

In FIG. 10B, based on the result of determination of "not to transmit CSI/SRS" performed in step S112, the DRX state management unit 11 of the mobile station UE controls the CSI/SRS resource management unit 12 so as "not to transmit CSI/SRS" (S116b).

On the other hand, since the DRX state management unit 21 of the base station eNB receives SR after determining "not to expect CSI/SRS" from the mobile station UE in step S113, the DRX state management unit 21 controls the CSI/SRS resource management unit 22 so as to neglect the first CSI/SRS transmitted from the mobile station after receiving SR (S117b). In this case, the DRX state management unit 11 controls the CSI/SRS resource management unit 22 so as to expect next (second time, or after elapse of predetermined time) CSI/SRS from the mobile station UE.

Therefore, mismatch on processes of CSI/SRS between the mobile station UE and the base station eNB does not occur.

<Flowchart (Process Procedure of the Base Station eNB)>

Next, a process procedure example of the base station eNB in the third embodiment is described base on the flowchart diagram shown in FIG. 11. FIG. 11 is a flowchart diagram showing a process procedure per 1 subframe, and is described as a process at a time point of subframe "n+4", for example.

First, the DRX state management unit 21 of the base station eNB determines whether the determination result by n−4approach performed at the time point of subframe "n" is "not to expect CSI/SRS" from the mobile station UE at the time point of subframe "n+4" (S401).

If it is determined "not to expect CSI/SRS" at the time point of subframe "n+4" (Yes in step S401), it is determined whether SR reception has been performed from subframe "n" when the determination process of n−4approach was performed until subframe "n+4" (S402).

If it is determined that reception of SR has been performed after the determination process of n−4approach (Yes in step S402), the DRX state management unit 21 controls the CSI/SRS resource management unit 22 to perform scheduling so as to neglect the first CSI/SRS transmitted from the mobile station UE after receiving SR and so as not to exert an influence on other mobile apparatuses UE (S403).

On the other hand, if it is determined "not to expect CSI/SRS" at the time point of subframe "n+4" (No in step S401) or if it is determined that SR reception has not been performed after the determination process of n−4approach (No in step S402), the DRX state management unit 21 causes the CSI/SRS resource management unit 12 to perform control based on the determination result by n−4approach.

As mentioned above, according to the third embodiment, if the base station eNB receives SR after it is determined "not to expect CSI/SRS" by n−4approach in the base station eNB, the base station eNB performs control so as to neglect the first CSI/SRS after reception of SR, and so as not to exert an influence to other mobile stations UE. Thus, effects due to mismatch occurrence on processes of CSI/SRS between the mobile station UE and the base station eNB can be suppressed.

Also, according to the third embodiment, effects due to mismatch occurrence can be suppressed by changing control content by the base station eNB. Thus, for example, implementation is easier compared with a case of changing process content of mobile stations UE since the number of mobile stations and the number of types of the mobile stations are greater than those of the base stations eNB in general.

In the above-mentioned first to third embodiments, as an example of a case in which process mismatch on CSI/SRS may occur between the mobile station UE and the base station eNB, reception of DRX command MAC CE, in the mobile station UE, which is a trigger for suddenly stopping an Active state of the mobile station UE is shown (FIGS. 6A, 6B, 8A, 8B, 10A and 10B). However, for example, also in a case where an Active Time is suddenly extended, mismatch may occur since CSI/SRS cannot be transmitted. Then, the present invention can be also applied not only to the case where the Active Time is suddenly stopped but also to a case where the Active Time is suddenly extended, so that mismatch of processes on CSI/SRS between the mobile station UE and the base station eNB can be avoided.

In the embodiments of the present invention, the Scheduling Request transmitted from the mobile station UE to the base station eNB is an example of a control signal, and the present invention can be applied also to a case where a control signal other than the Scheduling Request is transmitted.

For convenience of explanation, the user apparatus UE and the base station eNB have been explained by using functional block diagrams. However, each apparatus may be implemented in hardware, software, or a combination thereof. The software that operates according to the present invention (software executed by a processor provided in the user apparatus UE, software executed by a processor provided in the base station eNB) may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

Although embodiments of the present invention have been described in detail, the present invention is not limited to the above-mentioned embodiments and it is possible to provide various variations and modifications within a scope of the present invention.

The present international application claims priority based on Japanese patent application No. 2013-099326, filed in the JPO on May 9, 2013, and the entire contents of the Japanese patent application No. 2013-099326 are incorporated herein by reference.

DESCRIPTION OF REFERENCE SIGNS eNB base station
UE mobile station
11 DRX state management unit
12 CSI/SRS resource management unit
13 DL signal reception unit
14 UL signal transmission unit
21 DRX state management unit
22 CSI/SRS resource management unit
23 UL signal reception unit
24 DL signal transmission unit

The invention claimed is:

1. A mobile station that communicates with a base station, comprising:
   a unit configured to determine whether to transmit, to the base station, quality information indicating radio quality when a predetermined time elapses based on a state, of the mobile station, which is an active state or not in discontinuous reception control; and
   a unit configured to, even when it is determined not to transmit the quality information based on the determination, transmit the quality information when the predetermined time elapses in a case where a scheduling request is transmitted to the base station before the predetermined time elapses.

2. A mobile station that communicates with a base station, comprising:
   a unit configured to determine whether to transmit, to the base station, quality information indicating radio quality when a predetermined time elapses based on a state, of the mobile station, which is an active state or not in discontinuous reception control; and
   a unit configured to control transmission of the quality information based on a determination result of the determination; and
   wherein, when it is determined not to transmit the quality information based on the determination, the mobile station does not transmit the quality information even when a scheduling request is transmitted from the mobile station.

3. A base station that communicates with a mobile station, comprising:
   a unit configured to determine whether to expect quality information indicating radio quality that is transmitted from the mobile station when a predetermined time elapses based on a state, of the mobile station, which is an active state or not in discontinuous reception control; and
   a control unit configured to, when receiving a scheduling request from the mobile station before the predetermined time elapses after it is determined not to expect the quality information based on the determination, perform control so as not to expect first quality information to be transmitted from the mobile station after receiving the scheduling request.

4. The base station as claimed in claim 3, wherein, when receiving a scheduling request from the mobile station before the predetermined time elapses after it is determined not to expect the quality information based on the determination, the control unit performs scheduling such that uplink transmission in a process for the first quality information to be transmitted from the mobile station after receiving the scheduling request does not collide with uplink transmission of other mobile stations.

5. The base station as claimed in claim 3, wherein the first quality information is quality information to be transmitted from the mobile station within a predetermined time after receiving the scheduling request.

6. A mobile communication system including a mobile station and a base station that communicates with the mobile station,
   the mobile station comprising:
   a unit configured to determine whether to transmit, to the base station, quality information indicating radio quality when a predetermined time elapses based on a state, of the mobile station, which is an active state or not in discontinuous reception control; and
   a unit configured to, even when it is determined not to transmit the quality information based on the determination, transmit the quality information when the predetermined time elapses in a case where a scheduling request is transmitted to the base station before the predetermined time elapses,
   the base station comprising:
   a unit configured to, when receiving a scheduling request from the mobile station before the predetermined time elapses, expect the quality information to be transmitted from the mobile station when the predetermined time elapses.

7. A mobile communication system including a mobile station and a base station that communicates with the mobile station,
   the mobile station comprising:
   a unit configured to determine whether to transmit, to the base station, quality information indicating radio quality when a predetermined time elapses based on a state, of the mobile station, which is an active state or not in discontinuous reception control; and
   a unit configured to control transmission of the quality information based on a determination result of the determination in the mobile station;
   the base station comprising:
   a unit configured to determine, based on the state, whether to expect the quality information that is transmitted from the mobile station when the predetermined time elapses; and
   a unit configured to control whether to expect the quality information based on a determination result of the determination in the base station,
   wherein, when it is determined not to transmit the quality information based on the determination, the quality information is not transmitted even when a scheduling request is transmitted from the mobile station.

8. A transmission control method performed by a mobile station that transmits quality information indicating radio quality to a base station, comprising:
   a step of determining whether to transmit, to the base station, the quality information when a predetermined time elapses based on a state, of the mobile station, which is an active state or not in discontinuous reception control; and
   a step of, even when it is determined not to transmit the quality information based on the determination, transmitting the quality information when the predetermined time elapses in a case where a scheduling request is transmitted to the base station before the predetermined time elapses.

9. A transmission control method performed by a mobile station that transmits quality information indicating radio quality to a base station, comprising:
- a step of determining whether to transmit, to the base station, the quality information when a predetermined time elapses based on a state, of the mobile station, which is an active state or not in discontinuous reception control; and
- a step of controlling transmission of the quality information based on a determination result of the determination,
- wherein, when it is determined not to transmit the quality information based on the determination, the mobile station does not transmit the quality information even when a scheduling request is transmitted from the mobile station.

10. A reception control method performed by a base station that receives quality information indicating radio quality transmitted from a mobile station, comprising:
- a step of determining whether to expect the quality information that is transmitted from the mobile station when a predetermined time elapses based on a state, of the mobile station, which is an active state or not in discontinuous reception control; and
- a step of, when receiving a scheduling request from the mobile station before the predetermined time elapses after it is determined not to expect the quality information based on the determination, performing control so as not to expect first quality information to be transmitted from the mobile station after receiving the scheduling request.

11. The base station as claimed in claim 4, wherein the first quality information is quality information to be transmitted from the mobile station within a predetermined time after receiving the scheduling request.

* * * * *